(12) United States Patent
Schulz

(10) Patent No.: US 10,105,629 B2
(45) Date of Patent: *Oct. 23, 2018

(54) FILTER, HOLLOW FILTER ELEMENT, AND FILTER HOUSING OF A FILTER, AND SEAL OF A HOLLOW FILTER ELEMENT

(71) Applicant: Mann+Hummel GMBH, Ludwigsburg (DE)

(72) Inventor: Franziska Schulz, Schifferstadt (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 227 days.

This patent is subject to a terminal disclaimer.

(21) Appl. No.: 14/934,749

(22) Filed: Nov. 6, 2015

(65) Prior Publication Data

US 2016/0129385 A1     May 12, 2016

(30) Foreign Application Priority Data

Nov. 6, 2014 (DE) .......................... 10 2014 016 300

(51) Int. Cl.
    *B01D 46/24*           (2006.01)
    *B01D 46/52*           (2006.01)
                 (Continued)

(52) U.S. Cl.
    CPC .......... *B01D 46/2411* (2013.01); *B01D 29/58* (2013.01); *B01D 46/0021* (2013.01);
                 (Continued)

(58) Field of Classification Search
    CPC ............ B01D 46/0005; B01D 46/0021; B01D 46/2411; B01D 2271/027; B01D 29/58
See application file for complete search history.

(56) References Cited

U.S. PATENT DOCUMENTS

2006/0254229 A1* 11/2006 Schrage ............. B01D 46/0004
                                                   55/498
2009/0038276 A1* 2/2009 Gunderson ........ B01D 46/0021
                                                   55/343
(Continued)

FOREIGN PATENT DOCUMENTS

DE        102013014492 A1     3/2015
WO        2009146962 A1     12/2009

*Primary Examiner* — Robert Clemente
(74) *Attorney, Agent, or Firm* — James Hasselbeck

(57) ABSTRACT

A filter (10) for filtering fluid, in particular air, water, fuel, oil, or urea-water solution, in particular of an internal combustion engine, in particular of a motor vehicle, a multiple-bellows hollow filter element (44), a filter housing (30) of a filter (10), and a seal (90) of a hollow filter element (44) are described. The filter (10) comprises at least one filter housing (30), which comprises at least one inlet (28) for fluid to be filtered and at least one outlet (36) for filtered fluid. At least one hollow filter element, in particular a multiple-bellows hollow filter element (44) can be arranged in the at least one filter housing (30) such that it separates the at least one inlet (28) from the at least one outlet (36). The at least one filter housing (30) comprises at least one first housing part (42) having at least one installation opening (40) for the at least one hollow filter element (44), which can be closed using at least one second housing part (38). The at least one hollow filter element (44) comprises at least one filter bellows (46, 48), which comprises at least one filter medium (50), through which flow can occur for filtering of the fluid. The at least one filter bellows (46, 48) at least partially delimits at least one element interior (60, 64). An element axis (32) of the at least one hollow filter element (44) extends coaxially, axially, or in parallel in relation to an installation/removal axis of the at least one hollow filter element (44), in relation to which the hollow filter element (44) can be installed in the filter housing (30) and removed (Continued)

from the filter housing (30) through the at least one installation opening (40) in parallel, axially, or coaxially.

7 Claims, 10 Drawing Sheets

(51) Int. Cl.
    *B01D 29/58*     (2006.01)
    *B01D 46/00*     (2006.01)
    *B01D 46/10*     (2006.01)
    *B01D 50/00*     (2006.01)

(52) U.S. Cl.
    CPC ......... *B01D 46/0024* (2013.01); *B01D 46/10* (2013.01); *B01D 46/521* (2013.01); *B01D 50/002* (2013.01); *B01D 2271/027* (2013.01); *B01D 2275/208* (2013.01)

(56) References Cited

U.S. PATENT DOCUMENTS

| | | | |
|---|---|---|---|
| 2009/0145095 A1 | 6/2009 | Juliar et al. | |
| 2010/0186353 A1* | 7/2010 | Ackermann | B01D 46/0021 55/321 |
| 2010/0313533 A1* | 12/2010 | Muenkel | B01D 46/0021 55/484 |
| 2011/0000458 A1* | 1/2011 | Muenkel | B01D 46/0021 123/198 E |
| 2013/0255203 A1* | 10/2013 | Muenkel | B01D 46/0021 55/337 |
| 2014/0014597 A1* | 1/2014 | Knight | B01D 29/50 210/806 |
| 2014/0033666 A1* | 2/2014 | Menssen | B01D 46/2418 55/495 |
| 2014/0053521 A1* | 2/2014 | Muenkel | B01D 46/0021 55/489 |
| 2014/0290194 A1* | 10/2014 | Muenkel | B01D 46/0024 55/482 |
| 2015/0107200 A1* | 4/2015 | Menssen | F02M 35/02416 55/482 |
| 2016/0045848 A1* | 2/2016 | Campbell | B01D 46/525 55/357 |
| 2016/0129384 A1* | 5/2016 | Schulz | B01D 29/213 55/482 |

* cited by examiner

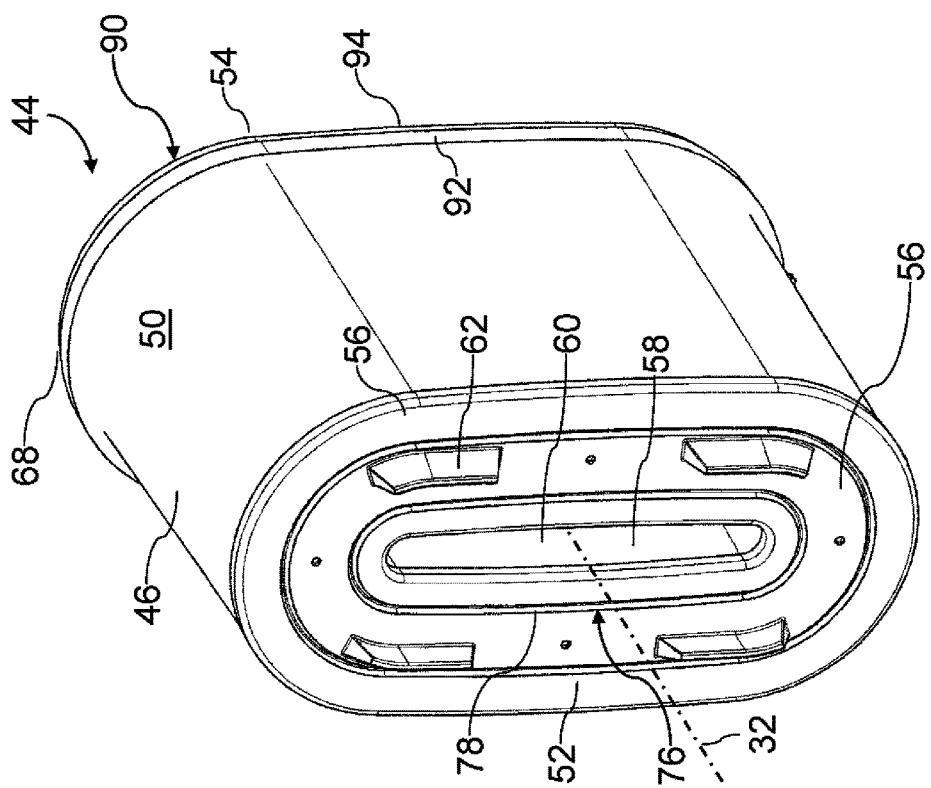
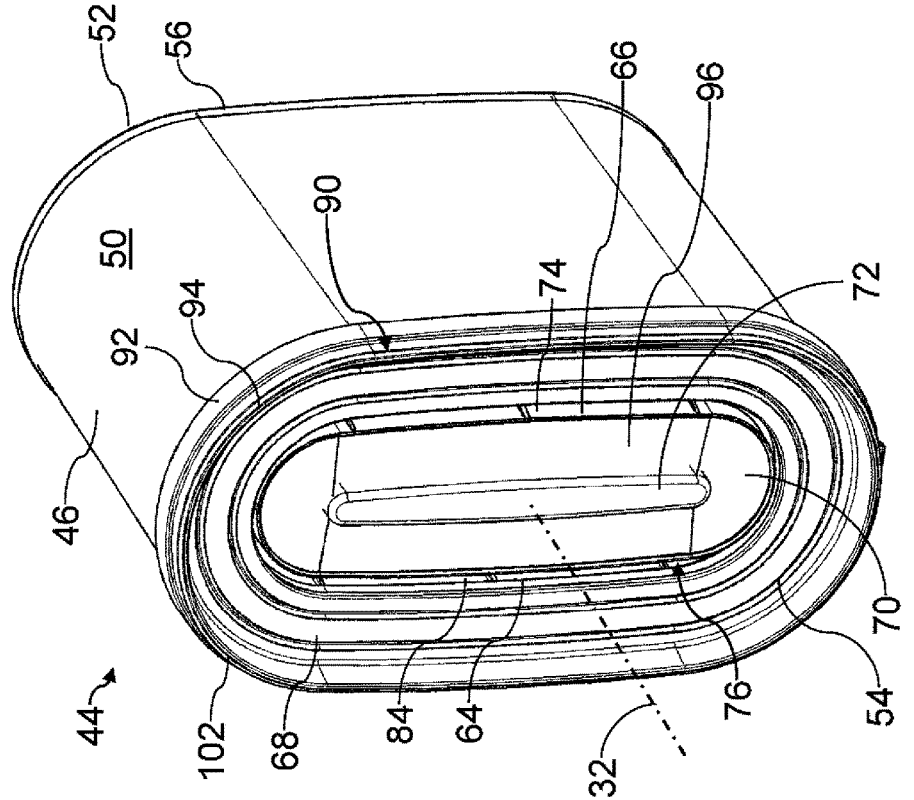

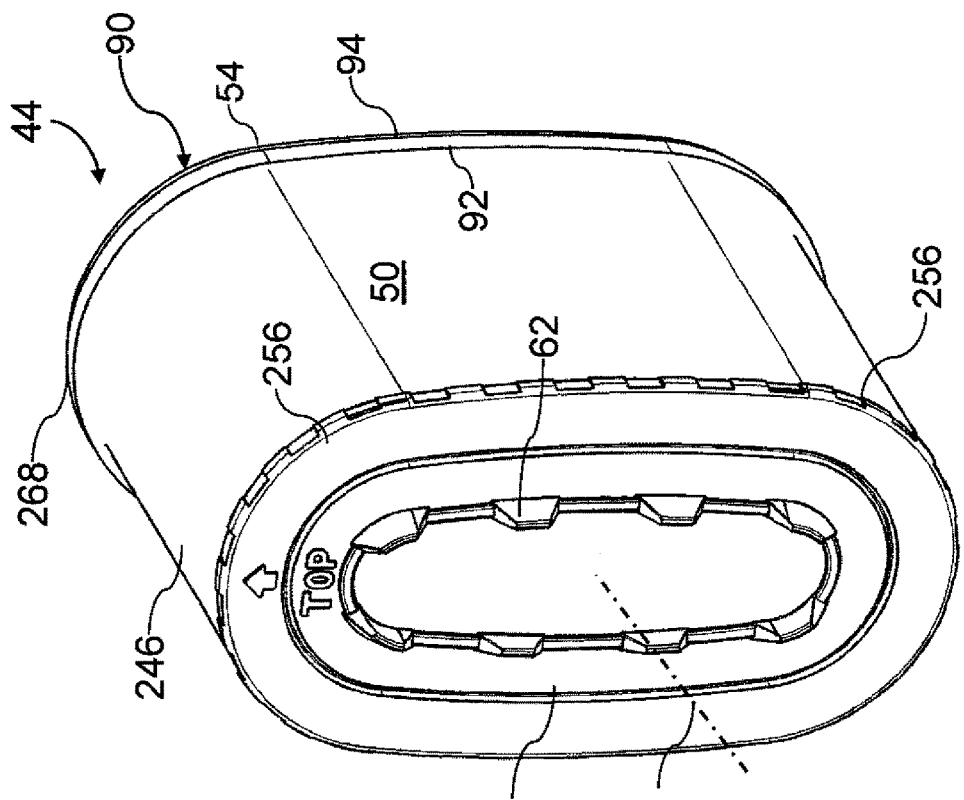
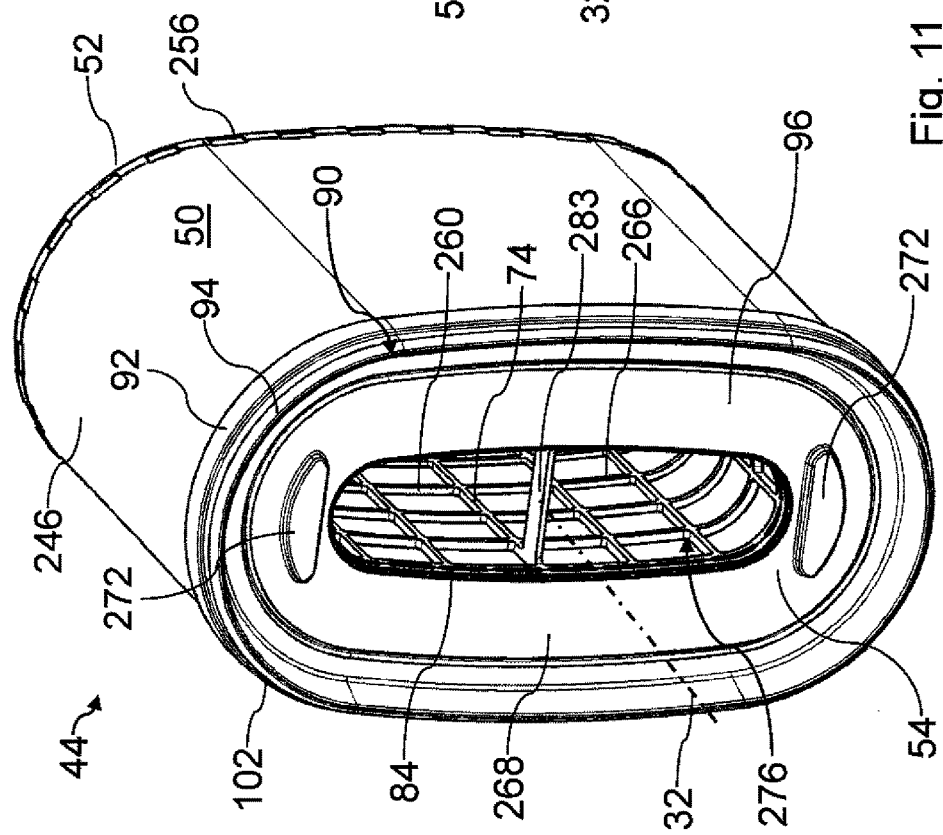

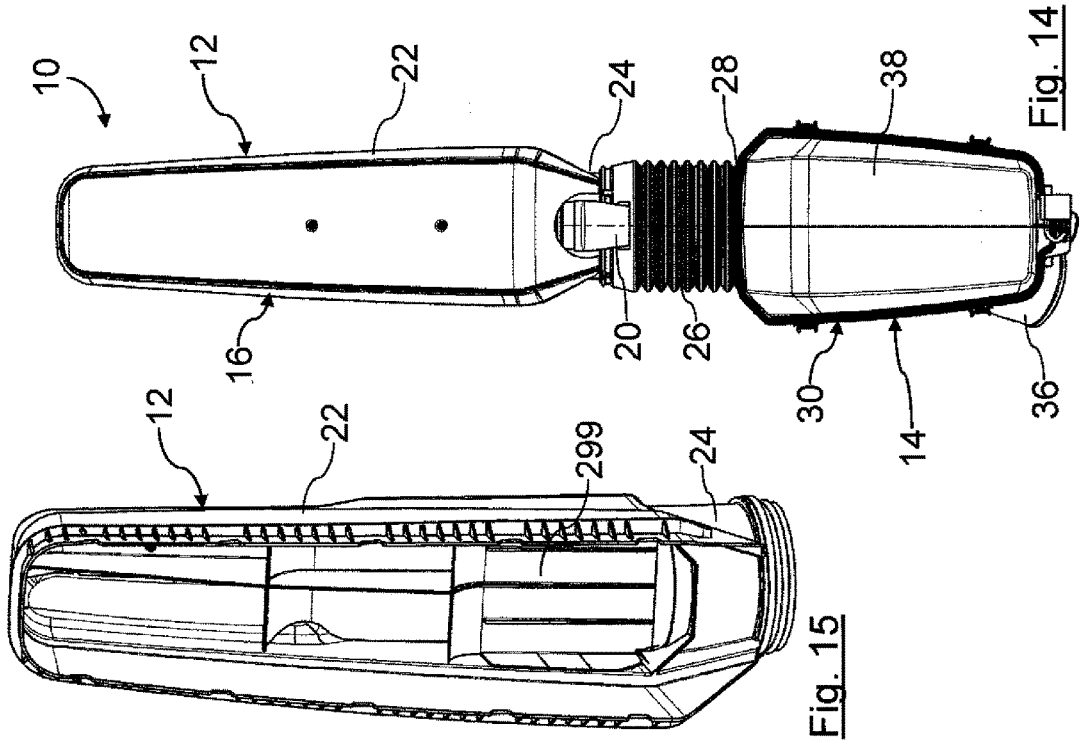
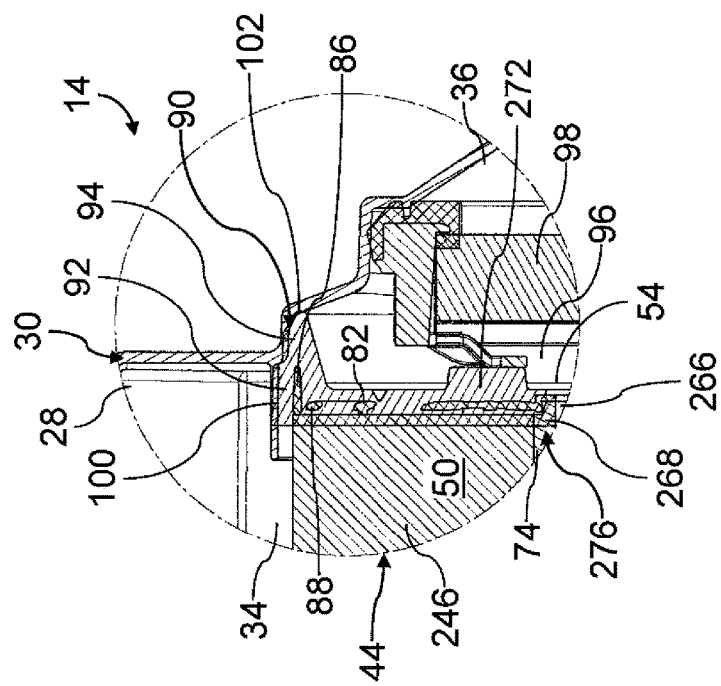

FILTER, HOLLOW FILTER ELEMENT, AND FILTER HOUSING OF A FILTER, AND SEAL OF A HOLLOW FILTER ELEMENT

The invention relates to a filter for filtering fluid, in particular air, water, fuel, oil, or urea-water solution, in particular of an internal combustion engine, in particular of a motor vehicle, having at least one filter housing, which comprises at least one inlet for fluid to be filtered and at least one outlet for filtered fluid, in which at least one hollow filter element, in particular a multiple-bellows hollow filter element, can be arranged such that it separates the at least one inlet from the at least one outlet, and which comprises at least one first housing part having at least one installation opening for the at least one hollow filter element, which can be closed using at least one second housing part, wherein the at least one hollow filter element comprises at least one filter bellows, which comprises at least one filter medium, through which flow can occur for filtering the fluid and which at least partially delimits at least one element interior.

Furthermore, the invention relates to a hollow filter element, in particular a multiple-bellows hollow filter element, of a filter for filtering fluid, in particular air, water, fuel, oil, or urea-water solution, in particular of an internal combustion engine, in particular of a motor vehicle, in particular of a filter according to the invention, having at least one filter bellows, which comprises at least one filter medium, through which flow can occur for filtering of the fluid, and which at least partially delimits at least one element interior.

In addition, the invention relates to a filter housing of a filter for filtering fluid, in particular air, water, fuel, oil, or urea-water solution, in particular of an internal combustion engine, in particular of a motor vehicle, which comprises at least one inlet for fluid to be filtered and at least one outlet for filter fluid, in which at least one hollow filter element, in particular one multiple-bellows hollow filter element, can be arranged such that it separates the at least one inlet from the at least one outlet, and which comprises at least one first housing part having at least one installation opening for the at least one hollow filter element, which can be closed using at least one second housing part.

Finally, the invention relates to a seal of a hollow filter element, in particular a multiple-bellows hollow filter element.

TECHNICAL FIELD

An air filter for an internal combustion engine is known from WO 2009/106588 A1, having a main filter element arranged in a filter housing. The fluid to be filtered is to flow through it. The main filter element is designed as a double-bellows filter having two filter bellows placed radially one inside the other. Flow is to occur through the filter bellows in the radial direction. A flow chamber for the fluid is formed between the filter bellows. It communicates with one end side of the main filter element, wherein each of the filter bellows is designed as a star filter having filter folds arranged in the shape of a star. A seal is located on one end side of the main filter element between one of the filter bellows and the filter housing. The main filter element is fixed by an insert, which is insertable laterally into the filter housing. This means that after the mounting of the main filter element, the insert enters the filter housing through a lateral opening of the filter housing. A sealing force acting in the axial direction is generated by the mounting of the insert element on insert rails, which extend in the filter housing, i.e., the main filter element, which was previously inserted into the filter housing, is pre-tensioned in the axial direction and engaged on the filter housing.

The invention is based on the object of embodying a hollow filter element of a filter and a filter of the type mentioned at the outset, in which the hollow filter element can be installed simply and reliably in the filter housing and a filtered-fluid side can be sealed off simply and reliably from an unfiltered-fluid side.

BACKGROUND OF THE INVENTION

This object is achieved according to the invention by the filter in that an element axis of the at least one hollow filter element extends coaxially, axially, or in parallel to an installation/removal axis of the at least one hollow filter element, to which the hollow filter element can be installed through the at least one installation opening into the filter housing and removed from the filter housing in parallel, axially, or coaxially.

According to the invention, the element axis and the installation/removal axis at least extend in parallel in the mounted state. In this manner, the at least one hollow filter element can be easily installed axially in relation to the element axis in the at least one first housing part. Tilting or twisting of the at least one hollow filter element during the installation or removal is not necessary. Due to the axial arrangement of the hollow filter element, the second housing part, in particular a housing cover, can additionally be easily installed axially in relation to the installation/removal axis on or in the at least one installation opening for the closure thereof.

The installation/removal axis can advantageously be parallel, axial, or coaxial to a housing axis of the filter housing. The element axis can advantageously be parallel, axial, or coaxial to the housing axis during the entire installation procedure or removal procedure, at least from the entry into the filter housing, in particular into an installation opening.

The at least one hollow filter element can advantageously be arranged in the filter housing in relation to the at least one outlet and the at least one outlet such that at least one filter bellows can have flow through it from the radial inside to the radial outside or from the radial outside to the radial inside on the incoming-flow-side and/or outgoing-flow-side with respect to the element axis.

The hollow filter element can advantageously be a multiple-bellows hollow filter element having at least two filter bellows. The filter bellows can each comprise at least one filter medium, through which flow can occur for filtering the fluid.

The filter can advantageously comprise at least one pre-filter. The pre-filter can comprise at least one particle separator, in particular a cyclone separator. Particles, in particular dust, can be discharged from the inflowing fluid, in particular air, using the at least one particle separator. Thus, the amount of dirt which reaches the hollow filter element can be reduced. The service life of the hollow filter element can be lengthened in this manner.

The at least one pre-filter can advantageously comprise at least one cyclone block having a plurality of cyclone separators. The separation efficiency and/or the throughput capacity of fluid can thus be improved.

The filter, in particular at least one pre-filter and/or one particle separator, can advantageously have at least one guiding geometry. A fluid flow in the filter can be influenced using the at least one guiding geometry. A partial vacuum can be further quieted, in particular made more uniform, during operation of the filter using the at least one guiding geometry.

Overall, the flow profile in the filter having the at least one pre-filter can be approximately Z-shaped. In this manner, the filter can be adapted in a space-saving manner to the available structural space.

The at least one pre-filter can advantageously be connected by means of a flexible, in particular elastic connection, in particular a hose or folded bellows, to a main filter, which contains the at least one hollow filter element. In this manner, installation tolerances and/or operationally-related vibrations can be better compensated for. The flexible connection can be made of a plastic, in particular an elastomer or rubber.

The filter can advantageously be embodied as an air filter. The air filter can advantageously be part of an air intake system of an internal combustion engine. It can be used for purifying combustion air, which is supplied to the internal combustion engine. However, the invention is not restricted to an air filter of an air intake system of an internal combustion engine of a motor vehicle. Rather, it can also be used in other types of air systems of motor vehicles. The air filter can also be an interior filter. The air filter can also be used outside automotive engineering, in particular in industrial engines.

The hollow filter element according to the invention and the filter according to the invention can advantageously be used in conjunction with an agricultural motor vehicle and/or an agricultural machine. However, the invention is not restricted thereto. It can also be used in other types of motor vehicles, in particular passenger automobiles, trucks, other utility vehicles, or machines, in particular construction vehicles or construction machines.

Instead of filtering air, the invention can also be used for filtering other types of fluids, in particular water, fuel, oil, or urea/water solution.

In one advantageous embodiment, the at least one second housing part, at least in the final mounting state of the filter, can advantageously exert a force, which acts at least axially in relation to the element axis, on the at least one hollow filter element.

The at least one hollow filter element can thus be positioned and/or compressed or clamped in the axial direction in the filter housing with the aid of the second housing part. In particular in combination with at least one seal, which acts at least in the radial direction with respect to the element axis, sealing between the filtered fluid side and the unfiltered fluid side can thus be improved. Furthermore, the holding function and the sealing function can thus each be improved independently of one another.

By combination of a radial incoming flow or outgoing flow with the axial compression or clamping, the ratio between required installation space and filter efficiency can be improved. In particular, the filter can thus be improved with respect to efficiency and space requirement if a double-bellows hollow filter element is used.

The force can advantageously engage from the at least one second housing part on at least one support nub and/or at least one support frame and/or at least one end body and/or at least one seal of the at least one hollow filter element. In this manner, the axial force can be transferred uniformly between the at least one hollow filter element, the first housing part, and the second housing part. The at least one hollow filter element can thus be held stably and precisely in the filter housing.

With the hollow filter element clamped axially between the first housing part and the second housing part, the force conduction through the second housing part can take place via the at least one support nub, the at least one support frame, the at least one end body, and the at least one seal to the first housing part.

In a further advantageous embodiment, the at least one hollow filter element can advantageously comprise at least one spacer element, in particular at least one support nub and/or at least one support web. The outer side of the hollow filter element can thus be held, in particular in the region of an inflow opening or an outflow opening, at a distance to a corresponding inner side of the filter housing. In this manner, using the at least one spacer element, a flow region can be predefined between the at least one hollow filter element and the filter housing, through which fluid can flow.

The at least one spacer element can advantageously be arranged on the at least one end body. The at least one spacer element can comprise at least one support web and/or at least one support nub.

The at least one spacer element can advantageously be integrally connected in particular to the at least one end body. In this manner, it can be produced and/or assembled jointly with the end body.

The at least one spacer element, in the case of a hollow filter element designed as a multiple-bellows hollow filter element, in particular a double-bellows element, can enable the hollow filter element, in particular the double-bellows element, to have radial and axial incoming flow with respect to the element axis. A flow channel or flow chamber can be defined on an unfiltered-fluid-side end side using the at least one first spacer element. The fluid, which first has radial incoming flow with respect to the element axis, can reach a radial inner element interior through the flow channel, after a deflection on the radial outer circumferential side of the at least one hollow filter element, through a corresponding inflow opening on the unfiltered-fluid-side end side of the hollow filter element. From there, the fluid can flow from the radial inside to the radial outside through a corresponding radial inner filter bellows and reach a second, outgoing-flow-side element interior. The second, outgoing-flow-side element interior can advantageously be located radially between the radial outer filter bellows and the radial inner filter bellows.

In a further advantageous embodiment, the at least one hollow filter element can advantageously comprise at least one seal, which can be arranged, with respect to the element axis, at least partially circumferentially in the region of at least one of the end sides of the hollow filter element. The at least one seal can be arranged and embodied so that it can separate an unfiltered fluid side from a filtered fluid side.

In a further advantageous embodiment, the at least one seal can advantageously interact with at least one corresponding sealing surface of a filter housing to form a seal radially with respect to the element axis. In this manner, sealing forces which contribute to the sealing action can act in the radial direction and holding forces which contribute to holding the filter element in the filter housing can act in the axial direction. The sealing function can thus be separated better from the holding function.

In a further advantageous embodiment, the at least one hollow filter element can advantageously have at least one end body on an axial end side with respect to an element axis. The at least one hollow filter element can be supported better on a corresponding end side using the at least one end body. In particular, an axial support with respect to the element axis can be improved.

Furthermore, the at least one end body can be embodied so that it can at least partially close the at least one hollow filter element on the corresponding end side. In this manner, a flow profile into the at least one hollow filter element and out of it can be influenced using the at least one end body.

The at least one end body can advantageously at least comprise at least one end disk or can be embodied as such.

The at least one filter can advantageously comprise at least one secondary filter element.

The at least one secondary filter element can advantageously be arranged downstream of the at least one hollow filter element, i.e., on the filtered-fluid side. Particles which were not captured by the at least one hollow filter element can be filtered out of the fluid stream using the at least one secondary filter element.

The at least one secondary filter element can advantageously comprise a finer filtration, in particular smaller pore sizes, than the at least one hollow filter element. In this manner, smaller particles can also be filtered out using the at least one secondary filter element than is possible using the hollow filter element.

The at least one secondary filter element can be a flat filter element.

The at least one secondary filter element can advantageously be arranged in a space-saving manner at least partially in at least one receptacle of the at least one hollow filter element. The at least one receptacle for the at least one secondary filter element can advantageously be at least partially also formed using the at least one seal and/or at least partially enclosed thereby.

This object is furthermore achieved according to the invention in the hollow filter element in that an element axis of the at least one hollow filter element extends coaxially, axially, or in parallel to an installation/removal axis of the at least one hollow filter element, in relation to which the hollow filter element can be installed through the at least one installation opening into the filter housing and removed from the filter housing in parallel, axially, or coaxially.

The advantages and features disclosed above in conjunction with the filter according to the invention and the advantageous embodiments thereof apply accordingly for the hollow filter element according to the invention and vice versa.

At least one end body can advantageously be arranged on an axial front and/or a rear end side of the hollow filter element with respect to an element axis.

At least one seal can advantageously be arranged at least partially circumferentially in the region of at least one of the end side of the hollow filter element with respect to the element axis.

The at least one seal can advantageously comprise at least one partially circumferential radial outer and/or radial inner seal section, which can interact with at least one corresponding sealing surface of a filter housing of the filter to form a seal radially with respect to the element axis. The at least one seal can be attached in the region of an axial end side. The sealing can advantageously be performed in the radial direction with respect to the element axis. In this manner, the seal can be separated with respect to force from a possible axial support of the hollow filter element, in the filter housing. The support and the sealing can thus each be improved per se.

The hollow filter element can advantageously be a round filter element having a round cross section, an oval filter element having an oval cross section, a flat-oval round filter element having a flattened oval cross section, a conical round filter element, in which the round cross section tapers in the axial direction in relation to the main axis, a conical-oval round filter element, in which the oval cross section tapers in the axial direction at least in the direction of a transverse axis, a conical flat-oval round filter element, in which the flat-oval cross section tapers in the axial direction at least in the direction of a transverse axis, or a hollow filter element having another type, in particular a polygonal, cross section and/or another type of axial cross-sectional profile in the direction of the main axis.

The hollow filter element can advantageously be a multiple-bellows hollow filter element, which has at least two filter bellows placed radially one inside the other. At least one element interior can be formed, in particular delimited, between the filter bellows. Such a multiple-bellows hollow filter element can be referred to as a double-bellows filter element. The filter bellows can each be embodied in accordance with an above-described hollow filter element.

At least two filter bellows of a multiple-bellows hollow filter element can advantageously be mechanically connected to one another by means of at least one end body and/or at least one support body. The filter bellows can be connected to one another on at least one axial front and/or one rear end side with respect to an element axis of the at least one hollow filter element.

At least one element interior can advantageously be used as a flow chamber for the fluid to be filtered. The at least one flow chamber can be connected to an end side of the hollow filter element. The flow chamber can be used both for discharging the filtered fluid and also for introducing unfiltered fluid.

Each of at least two filter bellows, which are placed radially one inside another, can be designed as a star filter having filter folds, which are arranged in a star shape and extend in the radial direction, having axially extending end edges. The radial inner end edges of the folds of the radial outer filter bellows and the radial outer end edges of the folds of the radial inner filter bellows can each delimit the at least one element interior, in particular the flow chamber.

In a double-bellows filter element, alternatively, the radial inner filter bellows can also be composed of at least two open, in particular flat and/or planar, filter bellows or filter elements, so-called flat filter elements. Additionally or alternatively, the radial outer filter bellows can also be composed of at least two open, in particular flat and/or planar filter elements.

At least one filter medium of at least one filter bellows can advantageously be circumferentially closed or open with respect to the element axis. The filter medium can in particular be folded or curved in a star shape, preferably in a zigzag or corrugated form. The filter medium can also be non-folded or non-curved.

At least one filter medium can at least comprise filter paper, filter nonwoven material, or another type of filter medium suitable for filtering the fluid. At least one filter medium can be single-layer or multilayered.

In a double-bellows filter element embodied as a round filter element, the radial inner circumferential side of the radial outer filter bellows and the radial outer circumferential side of the radial inner filter bellows can advantageously extend in parallel or diagonally in relation to one another, in particular conically. A radial outer element interior, in particular an outgoing-flow-side element interior, can be implemented between the radial outer circumferential side of the radial inner filter bellows and the radial inner circumferential side of the radial outer filter bellows. A radial inner element interior, in particular an incoming-flow-side element interior, can be implemented inside the radial inner filter bellows. For the filtration, the fluid can pass from the radial outside to the radial inside through the radial outer filter bellows to the radial outer element interior. The radial inner element interior can be closed on one end side of the double-bellows filter element and can be open on the opposite end side, in particular an incoming-flow-side end side. A part of the inflowing fluid can be deflected, in particular by 90°, on the radial outer circumferential side of the radial outer filter bellows. The deflected part of the fluid can flow through a fluid guiding region along the incoming-flow-side or unfiltered-fluid-side end side to an intake opening. The fluid can pass into the radial inner element interior through the intake opening on the incoming-flow-side end side. The fluid can flow through the radial inner filter bellows from the radial inner element interior to the radial outer element interior and can pass therefrom through corresponding outlet openings in the filtered-fluid-side end side out of the double-bellows filter element.

Alternatively, the hollow filter element can advantageously comprise a single filter bellows. The filter bellows can comprise at least one filter medium, through which flow can occur for filtering of the fluid. An element interior of the filter bellows can be closed on one end side using an end body in particular.

The at least one end body can advantageously at least comprise an end disk. The at least one end body can advantageously at least comprise plastic. The at least one end body can advantageously at least comprise polyurethane, in particular polyurethane foam. The at least one end body can advantageously be at least partially flexible, in particular elastic.

At least one end body can advantageously be permanently connected to at least one of the filter bellows.

The at least one end body can advantageously be connected to the filter bellows in a materially-bonded and/or friction-locked and/or formfitting manner, in particular by means of an adhesive bond, welded bond, a mechanical connection, in particular a plug connection, clamp connection, and/or by means of snapping in. The at least one end body can also be extruded or injection-molded, cast, or foamed onto the at least one filter bellows.

The at least one seal on the at least one end side can implement a seal between the hollow filter element and the filter housing.

The at least one seal can be used in particular for the flow-tight separation of an unfiltered fluid side from a filtered fluid side of the hollow filter element. It can prevent faulty fluid streams, which could impair an efficiency of the filter.

The at least one seal can advantageously comprise at least one sealing ring. The at least one seal section can be located on the radial outside or radial inside on the at least one sealing ring. The at least one sealing ring, in particular the at least one sealing section, can advantageously be circumferentially coherent. It can thus seal in a circumferentially closed manner.

The at least one seal can advantageously be connected integrally or in multiple pieces to the at least one end body. The at least one seal can advantageously be extruded or injection-molded on the at least one end body or implemented as a two-component part therewith.

The at least one seal can advantageously be at least partially flexible, in particular elastic. A sealing action can be improved in this manner. Furthermore, the at least one seal can better compensate for installation-related and/or operation-related tolerances and/or vibrations.

The at least one seal can advantageously be made of an elastic material or comprise such a material. The at least one seal can advantageously comprise polyurethane or another type of plastic, which is elastic in particular.

The at least one seal can advantageously comprise at least two seal sections having/made of identical materials and/or identical hardnesses. Alternatively, the at least one seal can comprise at least two seal sections having/made of different materials and/or different hardnesses. In this manner, a sealing action and/or a stability of the at least one seal can be improved. The at least one seal can advantageously be softer at least in a first seal section than in a second seal section. The at least one second seal section is arranged axially closer, with respect to the element axis, to the filter bellows than the at least one first seal section. The at least one seal can advantageously be harder in the region of a seal section on the unfiltered-fluid side, in particular the unfiltered-air side, than in the region of a seal section on the filtered-fluid side, in particular the filtered-air side.

The at least one seal can advantageously be supported at least sectionally using at least one support section. The at least one support section can advantageously be connected to at least one end body or at least can also be formed thereby. The at least one support section can advantageously at least sectionally support the at least one seal in a seal section which is soft in comparison to the remainder of the seal. The at least one support section can act as a reinforcement of the at least one seal.

The at least one seal can advantageously be or comprise a radial seal.

The at least one seal can advantageously be located outside of incoming-flow surfaces and outgoing-flow surfaces of the filter media, through which flow can occur. It can advantageously be located outside the filter lateral surfaces of the hollow filter element.

An installation/removal axis of the filter, in relation to which the hollow filter element can be installed into the filter housing and can be removed from the filter housing in parallel, axially, or coaxially, can advantageously extend axially, coaxially, or in parallel to the element axis. In this manner, the hollow filter element can be moved into the filter housing or out of it in an axial direction with respect to the element axis. The hollow filter element can be held, in particular clamped or chucked, in the filter housing in an axial direction with respect to the element axis. A radial compression of the at least one seal can be reduced in this case. A mechanical strain of the at least one seal can thus be reduced. Furthermore, the risk can thus be reduced that the at least one seal will deform in an undesired manner during the installation of the hollow filter element. A sealing action can be impaired by undesired deformation.

At least one end body can advantageously at least partially close at least the corresponding end side of the hollow filter element. In this manner, a fluid flow through the end side can be restricted or prevented. A flow profile in/on the hollow filter element can thus be predefined using the at least one end body.

The at least one seal can advantageously comprise at least two seal sections, which are spaced apart from one another at least axially with respect to the element axis. In this manner, two sealed regions which are axially spaced apart from one another can be implemented using the at least one seal.

In conjunction with an axial installation/removal axis of the filter, during the installation of the hollow filter element, firstly the axial front seal section in the installation direction can form a seal in relation to a corresponding sealing surface of the filter housing. Subsequently, the hollow filter element can be pushed further in the installation direction into the filter housing, in particular by mounting of a housing cover. In this case, at least one rear seal section can interact with the corresponding sealing surface of the filter housing. All seal sections can act to form a radial seal in the end position of the hollow filter element.

Furthermore, a redundancy can be created by the use of at least two seal sections. The sealing action and the reliability of the at least one seal can thus be further improved.

The at least one seal can advantageously at least comprise a double radial seal. The at least one seal can comprise a double radial seal or can be a double radial seal. In the double radial seal, two parallel seal sections are each circumferentially closed coherently with respect to the element axis. A sealing action can be improved further in this manner. Furthermore, a uniform seal can be produced in the circumferential direction.

The at least one seal can advantageously at least sectionally radially, with respect to the element axis, protrude beyond at least one radial outer filter bellows and/or at least one end body. In this manner, the at least one seal, in particular at least one sealing section, can be arranged on the radial outside on the hollow filter element. It can thus define the widest point of the hollow filter element with respect to the element axis. A free chamber, which can act as a flow chamber, can thus be defined between the radial outermost region of the at least one seal and the corresponding radial outer filter bellows.

The at least one seal can advantageously protrude axially beyond at least one of the filter bellows and/or at least one end body with respect to the element axis. In this manner, the at least one seal can define an axial outermost end of the hollow filter element.

The at least one seal, in particular a free end edge of the at least one seal, can advantageously in the axial direction as a stop of the hollow filter element. The at least one seal can stop on a corresponding housing region in an end position of the hollow filter element and thus delimit a movement axially in relation to the element axis. The hollow filter element can thus be placed more accurately and stably in the filter housing.

At least one support body, in particular a support frame, can advantageously be provided at least to support at least one end body and/or the at least one seal. A shape of the hollow filter element can be predefined and/or stabilized using the at least one support body. In its installed state, the hollow filter element can be better supported in the filter housing using the at least one support body. Holding forces acting on the hollow filter element can thus be introduced and distributed more uniformly into the hollow filter element and conducted out of it.

At least one of the end bodies can be supported using the at least one support body. A shape of a flexible end body can advantageously be stabilized using the at least one support body.

The at least one support body can additionally or alternatively support the at least one seal. In this manner, corresponding radial sealing forces can be introduced better into the at least one seal and/or relayed therefrom.

The at least one support body can advantageously be at least partially embedded in at least one end body and/or the at least one seal. A more stable connection can be implemented in this manner.

The at least one support body can advantageously have at least one latticed section. In this manner, it can easily be enclosed, in particular extrusion-coated or cast, using the material of the at least one end body and/or the at least one seal.

The at least one support body can advantageously at least comprise at least one support frame.

The at least one support body can advantageously comprise at least one section which extends radially with respect to the element axis. The at least one radially extending section can extend in and/or on at least one end body and/or the at least one seal. The at least one radially extending section can advantageously support the at least one end body and/or the at least one seal.

The at least one support body can advantageously comprise at least one section which extends axially with respect to the element axis. The at least one axially extending section can advantageously extend between the end sides of the filter element. It can improve the axial stability of the filter element. Furthermore, the at least one axially extending section can support at least one circumferential side of at least one of the filter bellows in the radial direction.

The at least one support body, in particular a support frame, can advantageously be integrally implemented.

The at least one support body can advantageously be at least partially cast or injection-molded from plastic in particular.

In particular using the at least one axial section of the at least one support body, axial forces, which can arise during the compression of the hollow filter element in the filter housing, can advantageously be introduced.

A hollow, in particular tubular support body can advantageously have at least one support strut. At least one support strut can advantageously be located in the region of an end of the support body. At least one support strut can advantageously be arranged in the region of the end which faces toward the outlet-side end side of the hollow filter element. At least one support strut can advantageously extend transversely, in particular perpendicularly, in relation to the element axis. In the case of an end body having an oval cross section, at least one support strut can extend in the direction of the short transverse axis of the oval support body and transversely, in particular perpendicularly, in relation to the element axis. At least one support strut can extend transversely through the element interior of at least one filter bellows. At least one support strut can be used for supporting the sides of the filter bellows, in an oval filter bellows, the long flat sides of the filter bellows.

The at least one seal can advantageously also form at least one receptacle, in particular a receptacle chamber, for at least one section of at least one secondary filter element of the filter. The at least one secondary filter element can be arranged in a simple and/or space-saving manner in the filter housing by means of the at least one receptacle. Furthermore, the secondary filter element can be placed more easily in relation to the hollow filter element with the aid of the at least one receptacle.

The secondary filter element can advantageously be a so-called flat filter element. In a flat filter element, the filter medium does not enclose an element interior, in contrast to a hollow filter element. The flat filter element can be planar or curved in this case.

The object is additionally achieved according to the invention by the filter housing in that a housing axis, to which an element axis of the at least one hollow filter element can be arranged coaxially, axially, or in parallel, extends coaxially, axially, or in parallel to an installation/removal axis of the at least one hollow filter element, to which the hollow filter element can be installed through the at least one installation opening into the filter housing and removed from the filter housing in parallel, axially, or coaxially.

The advantages and features listed above in conjunction with the filter according to the invention, the hollow filter element according to the invention, and the respective advantageous embodiments thereof apply for the filter housing according to the invention and the advantageous embodiments thereof and vice versa.

The object is finally achieved according to the invention by the seal according to the invention.

The advantages and features listed above in conjunction with the hollow filter element according to the invention, the filter according to the invention, and the filter housing according to the invention and the respective advantageous embodiments thereof apply accordingly for the seal according to the invention and vice versa.

BRIEF DESCRIPTION OF THE DRAWINGS

Further advantages, features, and details of the invention result from the following description, in which exemplary embodiments of the invention are explained in greater detail on the basis of the drawing. A person skilled in the art will expediently also consider the features, which are disclosed in combination in the drawing, the description, and the claims, individually and combine them to form reasonable further combinations.

In the schematic figures:

FIG. 5 shows an isometric illustration of the main filter element of the main filter from FIGS. 1 to 4 with a view of an outgoing-flow-side end side;

FIG. 6 shows an isometric illustration of the main filter element from FIG. 5 with a view of an incoming-flow-side end side;

FIG. 11 shows an isometric illustration of a main filter element of the main filter from FIGS. 9 and 10 with a view of an outgoing-flow-side end side;

FIG. 12 shows an isometric illustration of the main filter element from FIG. 1 with a view of an incoming-flow-side end side;

FIG. 13 shows an enlarged view of the main filter of the air filter from FIG. 9 in the region of a double radial seal of the main filter element;

FIG. 14 shows a view of the air filter from FIG. 9 with a view of the inlet side;

FIG. 15 shows a detail view of an open housing of a pre-filter of the air filter from FIG. 9.

Identical parts are provided with identical reference signs in the figures.

DETAILED DESCRIPTION OF THE INVENTION

Figure 1:
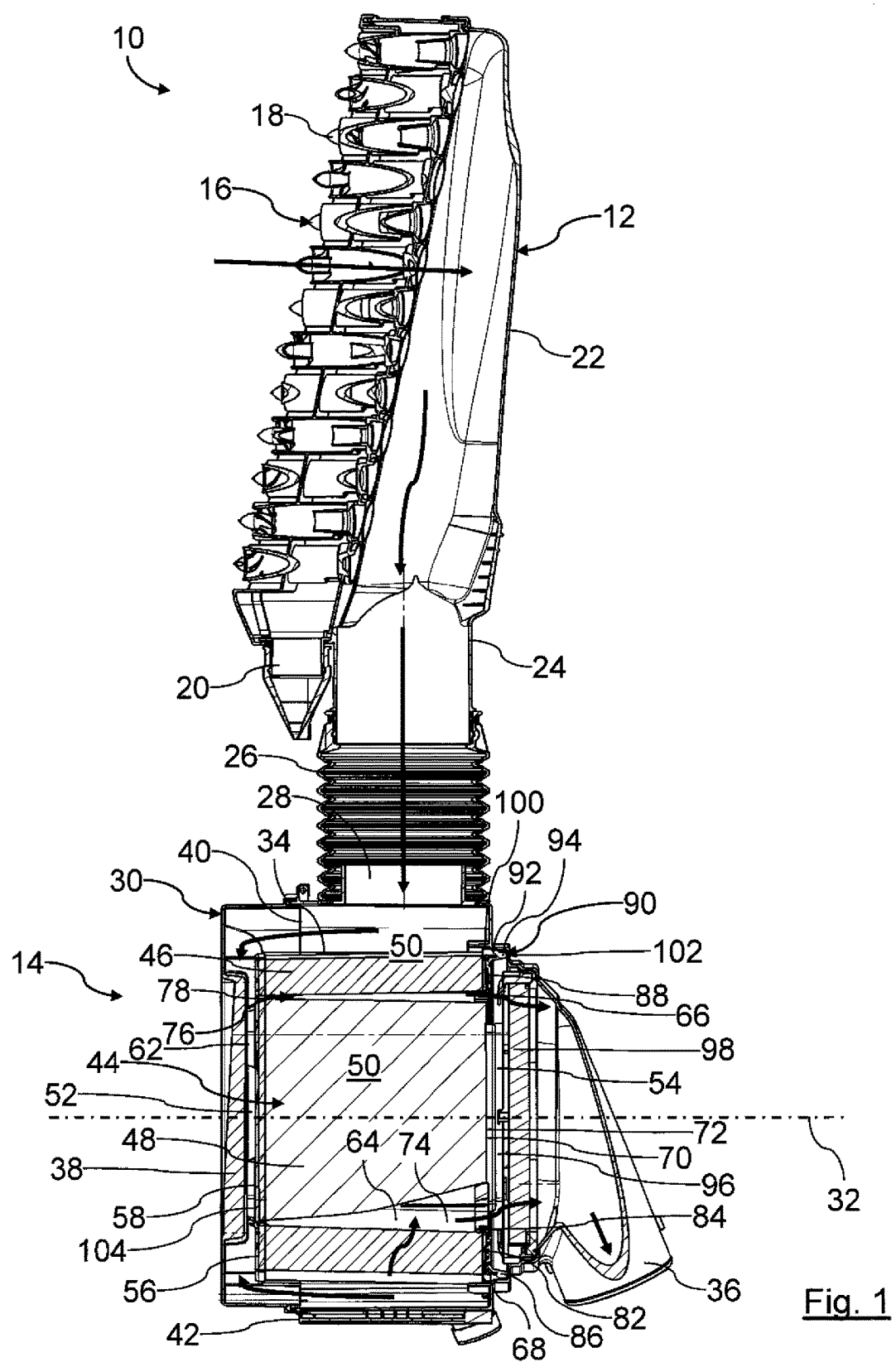
FIG. 1 shows a first long-side longitudinal section of an air filter of an internal combustion engine of a tractor having a pre-filter and a main filter.
Figure 3:
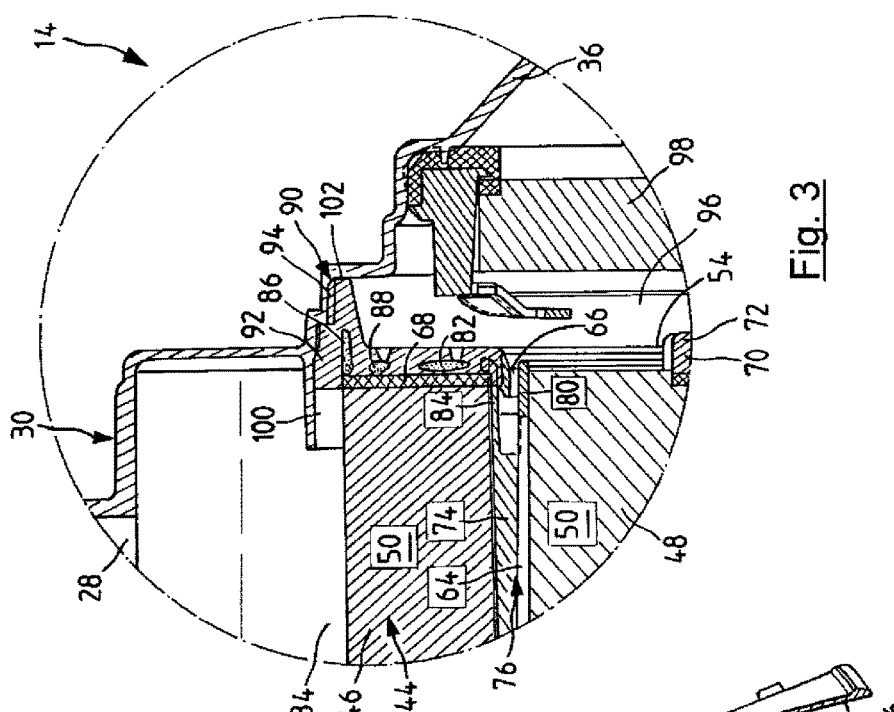
FIG. 3 shows an enlarged view of the main filter from FIG. 2 in the region of a double radial seal of a main filter element.
Figure 2:
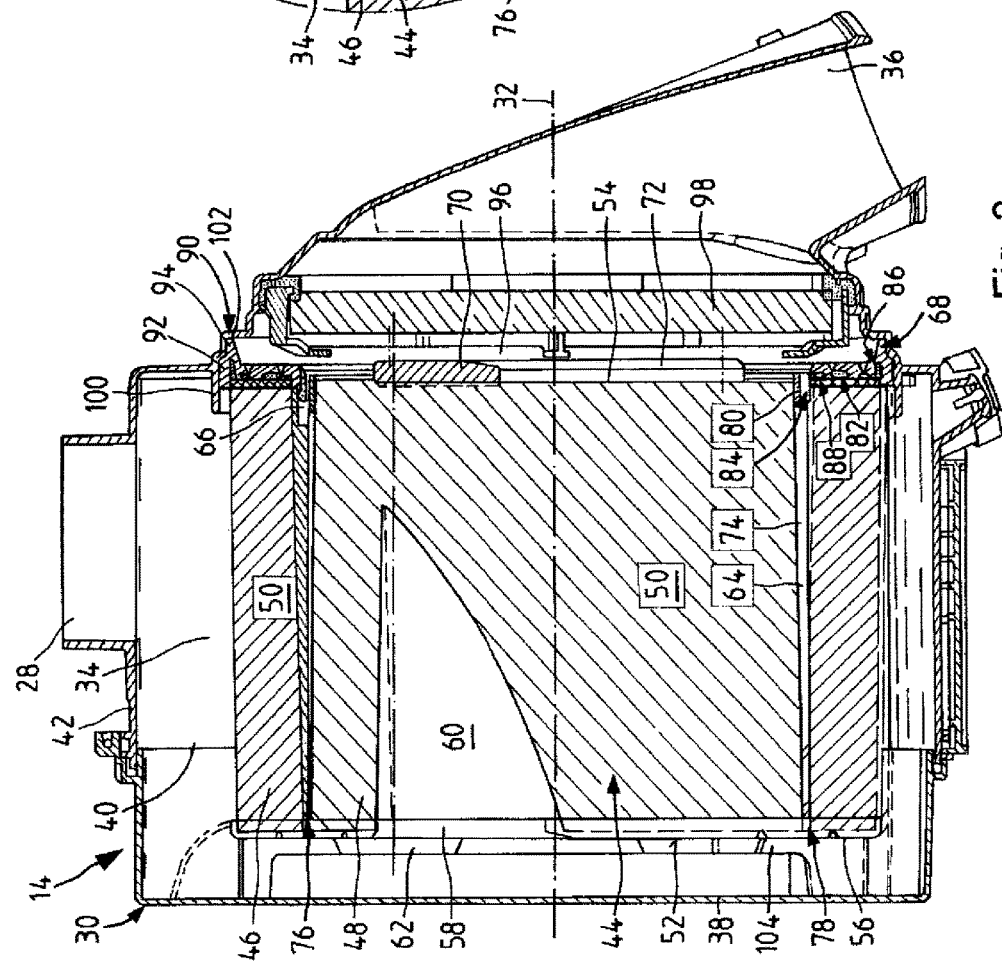
FIG. 2 shows a detail view of the main filter from FIG. 1.
Figure 4:
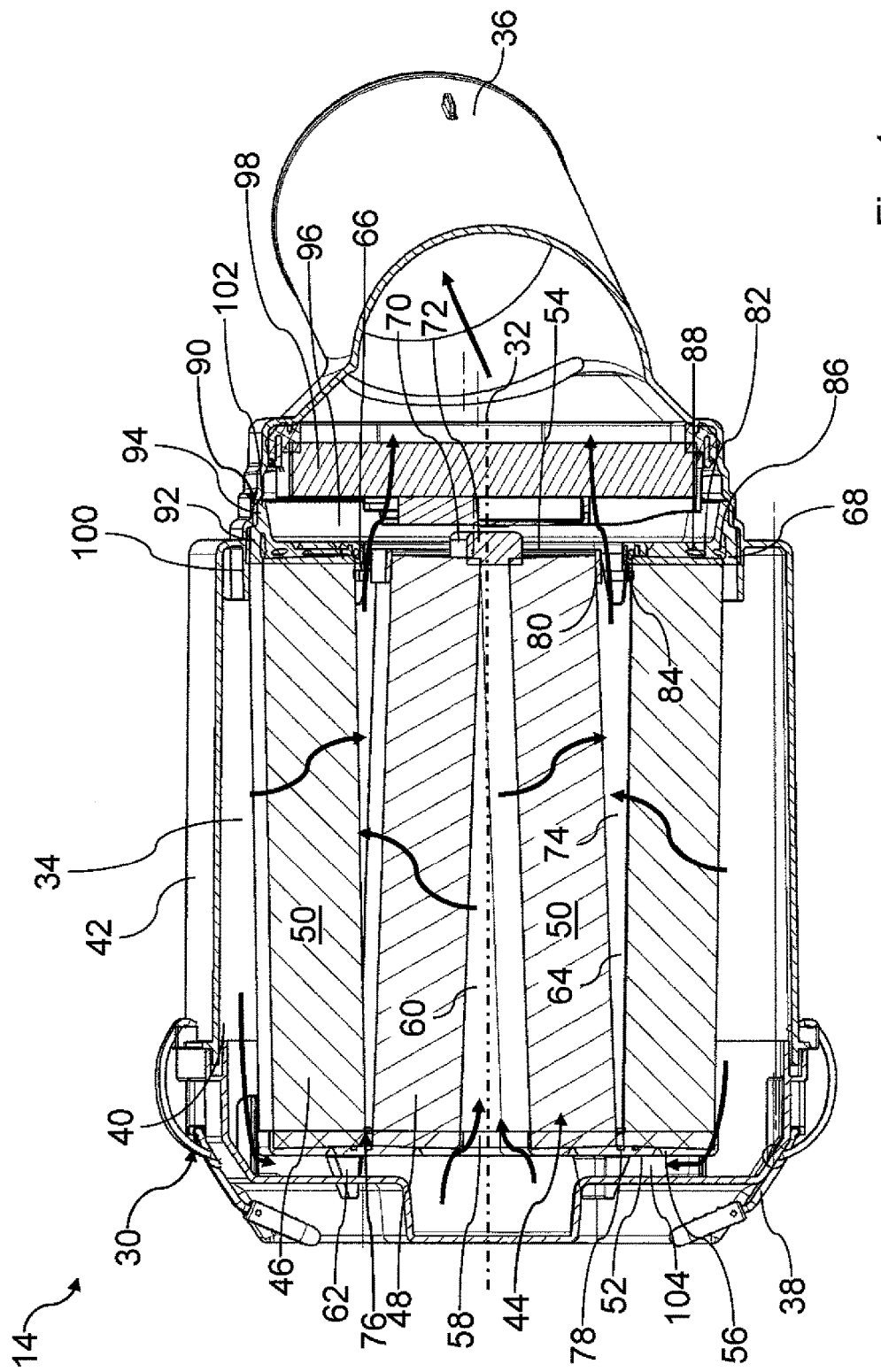
FIG. 4 shows a transverse-side longitudinal section of the main filter from FIGS. 1 to 3.
Figure 7:
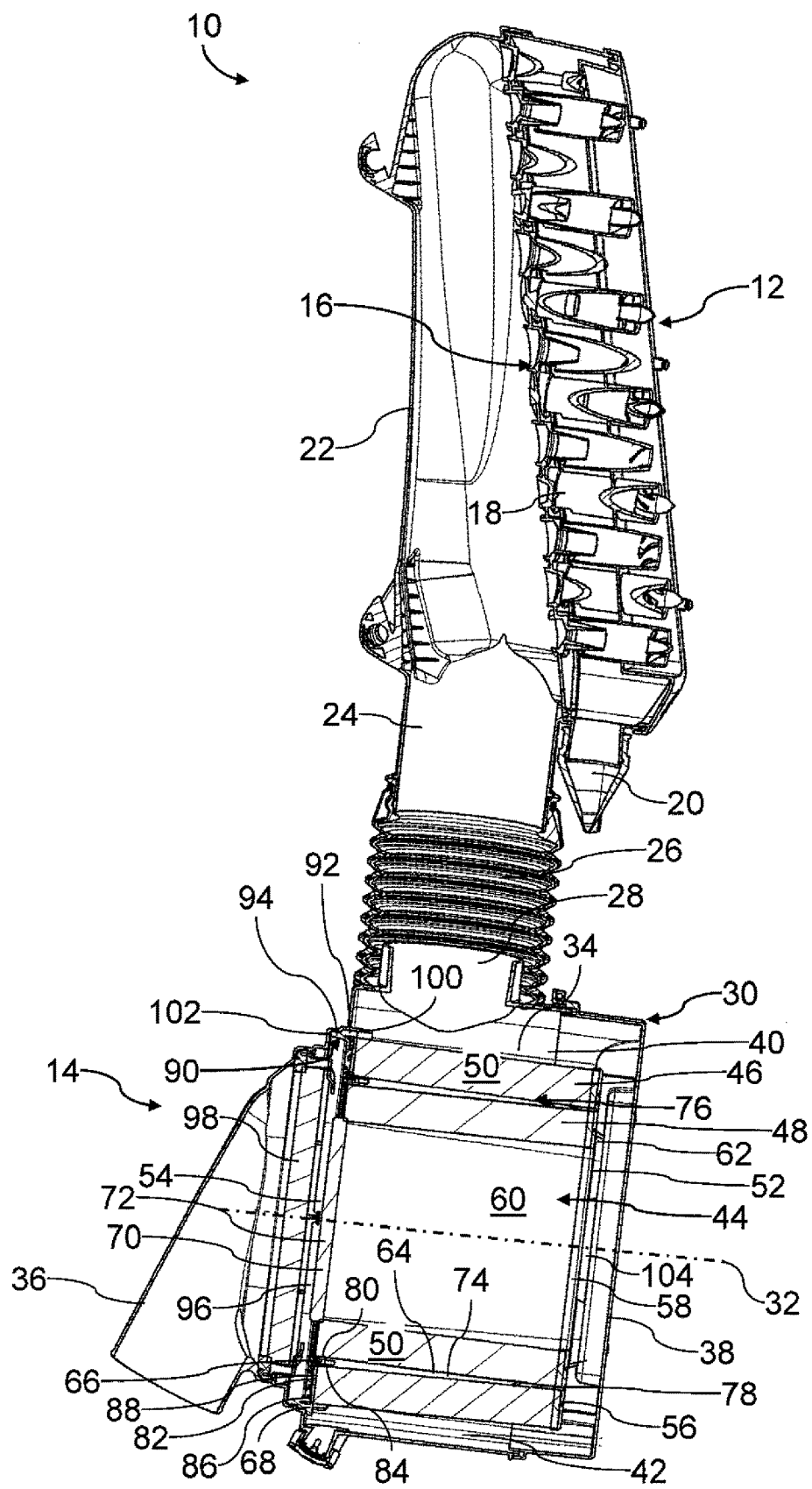
FIG. 7 shows a second long-side longitudinal section of the air filter from FIG. 1, wherein the viewing angle is rotated by 180° in relation to the illustration from FIG. 1.
Figure 8:
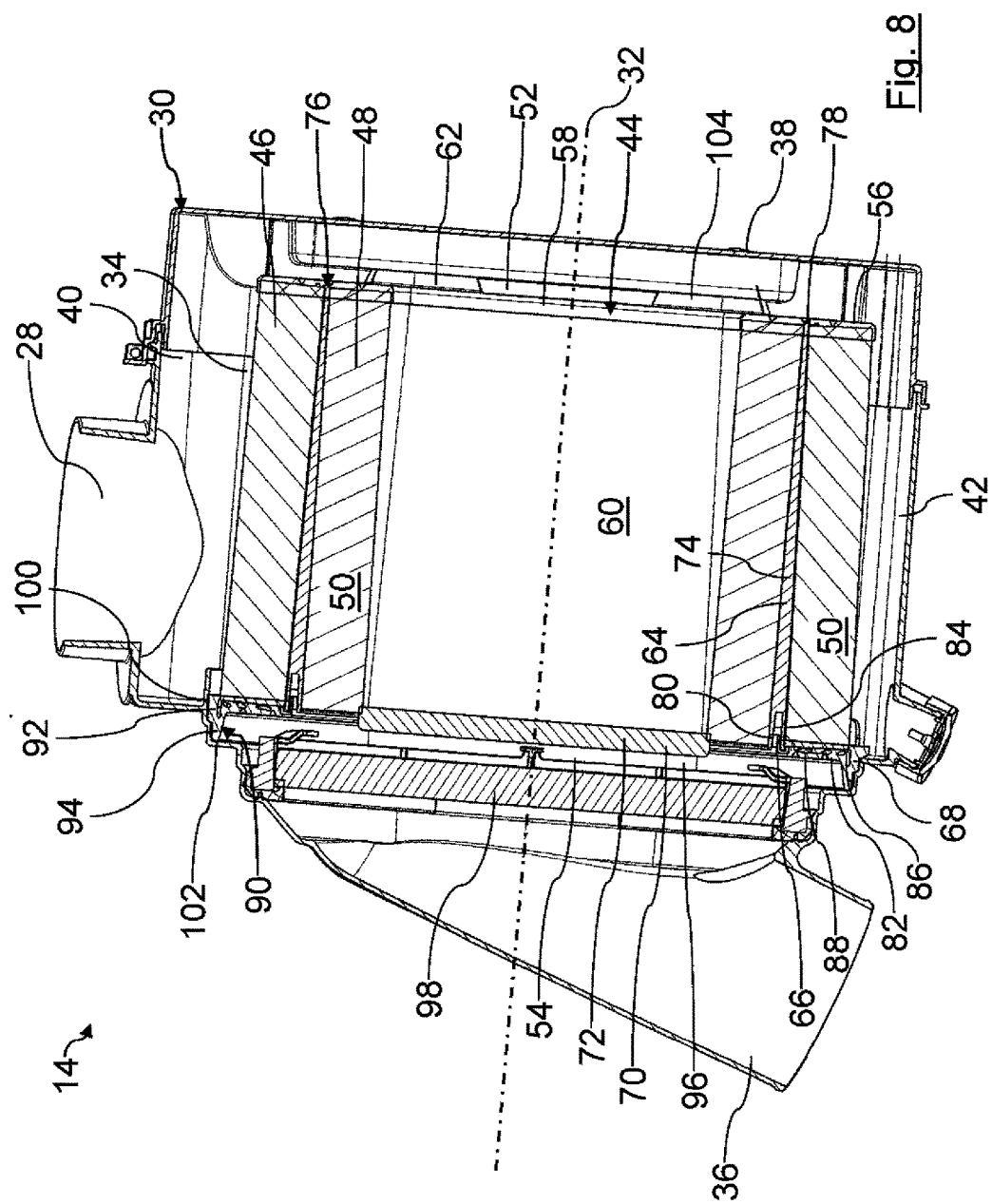
FIG. 8 shows a detail view of the main filter of the air filter from FIG. 7.

FIGS. 1 to 8 show an air filter 10 of an internal combustion engine of a tractor in different sections, detail views, and perspectives. The air filter 10 can be arranged, for example, in the vicinity of an A-column of the tractor. Combustion air, which is supplied to the internal combustion engine for combustion, is purified and filtered using the air filter 10. The air filter 10 comprises a pre-filter 12, shown on top in FIGS. 1 and 7, and a main filter 14, shown on the bottom in FIGS. 1 and 7, arranged one behind another in the flow direction of the intake air.

The pre-filter 12 comprises a cyclone box 16 on the inlet side, which comprises a plurality of cyclone separators 18. The intake air flows through the cyclone separators 18 on the inlet side. Large particles, for example, dust, are discharged from the intake air using the cyclone separators 18. The discharged particles can be removed from the air filter 10 via a discharge opening 20, which is located on a lower side of the pre-filter 12. The discharge opening 20 is closed during operation.

A pre-filter housing 22 of the pre-filter 12 has a pre-filter outlet nozzle 24 on the bottom, which is connected by means of an elastic, bellows-like connecting hose 26 to an inlet nozzle 28 of a main filter housing 30 of the main filter 14. The inlet nozzle 28 leads laterally into the main filter housing 30, on the circumferential side with respect to the horizontal axis 32 of the main filter 13, in FIGS. 1 and 8.

When reference is made hereafter to "radial", "axial", "coaxial", "circumferential", or the like, this refers to the axis 32, if not otherwise indicated.

A housing interior 34 of the main filter housing 30 is approximately coaxial to the axis 32. It has an oval cross section, which is flattened on its long sides. An outlet nozzle 36 leads out of the main filter housing 30 diagonally in relation to the axis 32 on one end side. The outlet nozzle 36 is connected using corresponding connecting hoses or pipes (not shown in the figures) to the internal combustion engine. The air purified using the air filter 10 is supplied to the internal combustion engine through the outlet nozzle 36. The end side having the outlet nozzle 36 is located on the side opposite to the cyclone box 16 with respect to a plane perpendicular to the axis 32.

A housing cover 38 is removably attached on the axially opposing end side of the main filter housing 30. The housing cover 38 closes a coaxial installation opening 40 of a housing pot 42 of the main filter housing 30. The housing pot 42 contains the greatest part of the housing interior 34.

A main filter element 44 of the air filter 10 can be plugged into the housing pot 42 and withdrawn therefrom in the direction of an installation/removal axis through the installation opening 40. The main filter element 44 is arranged in the housing interior 34 so that it separates the inlet nozzle 38 from the outlet nozzle 36.

The installation/removal axis, an element axis of the main filter element 44, and a housing axis of the main filter housing 30 are coincident in the exemplary embodiment shown with the axis 32 and are provided with the same reference sign for the sake of better comprehensibility. When the axis 32 is referred to hereafter, this refers to the corresponding axis depending on the context.

The main filter 14 having the main filter element 44 will be described hereafter on the basis of the detail views from FIGS. 2 to 6 and 8. The main filter element 44 is embodied as a so-called flat-oval double-bellows round filter element. The main filter element 44 comprises, with respect to the element axis, a radial outer filter bellows 46 and a radial inner filter bellows 48. The filter bellows 46 and 48 each comprise a filter medium 50 in the form of a filter paper, which is folded in a zigzag shape and closed around the circumference. The folded edges of the filter bellows 46 and 48 extend slightly diagonally in relation to the element axis in this case between the two end sides of the main filter element 44.

The filter bellows 46 and 48 extend approximately conically with respect to the axis 32, wherein the tips of the cones are oriented in opposite directions. The radial inner filter bellows 48 tapers from the inlet-side, unfiltered-air-side end side 52 of the main filter element 44 toward the outlet-side, filtered-air-side end side 54. The radial outer filter bellows 46 tapers from the outlet-side end side 54 toward the inlet-side end side 52.

On the inlet-side end side 52, the end sides of the filter bellows 46 and 48 are connected to one another by means of an inlet-side end disk 56. The inlet-side end disk 56 is foamed from elastic polyurethane onto the corresponding end sides of the filter bellows 46 and 48. A radial outer ring region of the inlet-side end disk 56 overlaps the end sides of the filter bellows 46 and 48 in a closed manner. In its center, the inlet-side end disk 56 has a coaxial inlet opening 58, which leads to a radial inner element interior 60. The radial inner element interior 60 is enclosed by the radial inner filter bellows 48.

On the outer side, which faces away axially from the filter bellows 46 and 48, the inlet-side end disk 56 has a total of four oblong spacer webs 62. The spacer webs 62 are located uniformly distributed in each case in the region of transitions from the long sides of the flat-oval inlet-side end disk 56 to the short sides thereof. Observed radially, the spacer webs 62 are located approximately at the height of the boundary between the radial outer filter bellows 46 and the radial inner filter bellows 48. The spacer webs 62 each accordingly extend curved approximately around the circumference and in the axial direction. They are integrally connected to the inlet-side end disk 56.

A radial outer element interior 64 extends between the radial outer circumferential side of the radial inner filter bellows 48 and the radial inner circumferential side of the radial outer filter bellows 46. The radial outer element interior 64 approximately has the shape of a flat-oval coaxial ring space. A cross section of the radial outer element interior 64 tapers approximately in a wedge shape toward the inlet-side end side 52. The radial outer element interior 64 opens at the outlet-side end side 54 with an outlet opening 64 for the purified air. The outlet opening 66 has the shape of a coaxial ring, which is flat-oval in cross section.

The corresponding end side of the radial outer filter bellows 46 is connected leak-tight at the outlet-side end side 54 to a radial outer outlet-side end disk 68. The corresponding end side of the radial inner filter bellows 48 is connected leak-tight to a radial inner outlet-side end disk 70. The outlet-side end disks 68 and 70 are foamed onto the end sides of the filter bellows 46 and 48 from polyurethane, similarly to the inlet-side end disk 56.

The outlet-side end disks 68 and 70 leave the outlet opening 66 free, so that purified air can flow out of the radial outer element interior 64 on the outlet-side end side 54 out of the main filter element 44.

The radial inner outlet-side end disk 70 has an approximately flat-oval shape and is closed. It closes the radial inner element interior 60 toward the outlet-side end side 54.

The radial inner outlet-side end disk 70 has a central, outlet-side support web 72 on the outer side facing away axially from the radial inner element interior 60. The support web 72 extends, in accordance with the profile of the radial inner element interior 60, on both sides radially in relation to the axis 32 and axially. The radial outer outlet-side end disk 68 will be explained in greater detail hereafter.

A plurality of axial frame sections 74 of a support frame 76 extend in the radial outer element interior 64 between the inlet-side end side 52 and the outlet-side end side 54.

The ends of the axial frame sections 74 are each integrally connected to an inlet-side circumferential frame section 78 on the inlet-side end side 52. The inlet-side circumferential frame section 78 is coaxial to the axis 32 and extends radially between the inlet-side end sides of the radial outer filter bellows 46 and the radial inner filter bellows 48. The inlet-side circumferential frame section 78 is embedded in the inlet-side end disk 46. It has a plurality of passage openings distributed around the circumference, through which the polyurethane can flow during the foaming to implement the end disk 56.

The radial width of the axial frame sections 74 increases, viewed in the axial direction, toward the outlet-side end side 54. The axial frame sections 74 are adapted with respect to the radial width thereof to the profile of the radial extension of the radial outer element interior 64.

At the outlet-side end side 54, the ends of the axial frame section 74 are integrally connected on the radial inner side thereof to a radial inner outlet-side circumferential frame section 80. The radial inner outlet-side circumferential frame section 80 approximately has the shape of a flat-oval, coaxial hollow cylinder. It is arranged on the radial outer circumferential side of the radial inner filter bellows 48. It is embedded in the radial inner outlet-side end disk 70.

On the radial outer side thereof, the outlet-side ends of the axial frame sections 74 are each integrally connected to a jacket section 84 of a radial outer outlet-side circumferential frame section 82. The jacket section 84 approximately has the shape of a flat-oval, coaxial hollow cylinder. It extends on the radial inner circumferential side of the radial outer filter bellows 46.

A seal support section 86 of the radial outer outlet-side circumferential frame section 82 approximately has the shape of a flat-oval hollow cylinder. It extends around the circumference and coaxially in axial extension in relation to the radial outer circumferential side of the radial outer filter bellows 46 away from the outlet-side end side of the filter bellows 46. The seal support section 86 has a plurality of passage holes, through which the polyurethane can flow during the embedding of the radial outer outlet-side circumferential frame section 82 in the radial outer outlet-side end disk 68.

The seal support section 86 is integrally connected to the jacket section 84 by means of a plurality of connecting sections 88. The connecting sections 88 are slightly curved struts and extend diagonally from radially inside to radially outside.

The radial outer outlet-side end disk 68 is embodied in the region of the radial outer circumferential side thereof as a so-called double radial seal 90. The double radial seal 90 protrudes beyond the main filter element 44, in particular the radial outer filter bellows 46, in the axial direction and the radial direction. The seal support section 86 is embedded in the double radial seal 90 and mechanically supports it. The seal support section 86 forms a reinforcement for the radial seal 90.

On the radial outer circumferential side, the double radial seal 90 has an unfiltered-air-side seal bulge 92 and a filtered-air-side seal bulge 94, which are spaced apart axially in relation to one another. The seal bulges 92 each extend in a circumferentially closed manner, and coaxially in relation to the axis 32. The filtered-air-side seal bulge 94 is located adjacent to the free end edge of the double radial seal 90 on the side facing away from the outlet-side end side of the radial outer filter bellows 46. The unfiltered air-side seal bulge 92 is located axially approximately at the height of the outlet-side end side of the radial outer filter bellows 46.

In the region of the unfiltered-air-side seal bulge 92, the double radial seal 90 can comprise the same hardness and the same material as in the region of the filtered-air-side seal bulge 94. Alternatively, the double radial seal 90 can comprise a different hardness and/or a different material in the region of the unfiltered-air-side seal bulge 92 than in the region of the filtered-air-side seal bulge 94. The double radial seal 90 can preferably be harder in the region of the unfiltered-air-side seal bulge 92 than in the region of the filtered-air-side seal bulge 94.

The double radial seal 90 is made of an elastic material corresponding to the radial outer outlet-side end disk 68. On the side thereof facing away from the outlet-side end side of the radial outer filter bellows 46, the double radial seal 90 overall extends approximately in the shape of a flat-oval hollow cylinder in the axial direction. It encloses a receptacle chamber 96 for a secondary filter element 98 on the outer side of the main filter element 44. The secondary air filter element 98 is embodied as a cuboid flat filter element.

During the assembly of the main filter 14, the secondary filter element 98 is moved through the initially open installation opening 40 axially in relation to the installation/removal axis into its position, in which it covers the inlet side of the outlet nozzle 36. The filter bellows of the secondary air filter element 98 extends radially and in the circumferential direction with respect to the axis 32 in its installation position.

Subsequently, the main filter element 44, with its outlet-side end side 54 in front and with its element axis coaxial to the housing axis and to the installation/removal axis, is inserted through the installation opening 40 into the housing interior 34 of the housing pot 42. Shortly before reaching the end position, the filtered-air-side seal bulge 94 strikes against a radial inner circumferential side of a housing sealing surface 100 of the housing pot 42. The filtered-air-side seal bulge 94 is then supported in the radial direction on the housing sealing surface 100.

Subsequently, the housing cover 38 is placed axially in relation to the installation/removal axis on the installation opening 40 and is clamped by means of clamps (not of greater interest here) in the axial direction against the housing pot 42. In this case, the housing cover 38 presses with its inner side against the spacer webs 62 of the main filter element 44. The axial force is transferred from the spacer webs 62 on the inlet-side end disk 56 onto the support frame 76 and therefrom onto the outlet-side end disks 68 and 70. The main filter element 44 is pushed further into the housing interior 34 in the axial direction by means of the axial force during the closing of the housing cover 38. In this case, the filtered-air-side seal bulge 94 slides along the housing sealing surface 100. The unfiltered-air-side seal bulge 92 also comes together with the housing sealing surface 100 and slides along it in the axial direction.

In the end position shown in FIGS. 1 to 4, 7, and 8, a free seal end edge 102 of the double radial seal 90 is supported on a corresponding housing-side step of the housing pot 42 in the axial direction. The seal bulges 92 and 94 each cooperate with the housing sealing surface 100 to form a seal radially.

The housing sealing surface 100 has the form of a radial inner circumferential jacket of a coaxial flat-oval cylinder in accordance with the radial outer profile of the double radial seal 90. The housing sealing surface 100 is stepped one time inward, viewed from the installation opening 40 in the axial direction.

In the end position, the spacer webs 62 are supported against the inner side of the housing cover 38 and thus act as spacer elements. An inlet-side airflow region 104 is thus kept free between the outer side of the inlet-side end disk 56, which faces away axially from the filter bellows 46 and 48, and the inner side of the housing cover 48, through which air can reach the inlet opening 58 from the circumferential side of the main filter element 44.

In the end position, a part of the secondary filter element 98 is located in a space-saving manner inside the receptacle chamber 96 of the main filter element 44.

During operation of the internal combustion engine, ambient air is sucked in through the air filter 10. The air firstly flows through the pre-filter 12, where entrained particles are discharged by means of the cyclone separator 18. The pre-purified air flows through the pre-filter housing 22, the pre-filter outlet nozzle 24, and the connecting hose 26 and reaches the housing interior 34 of the main filter 14 through the inlet nozzle 28. A part of the air flows there through the radial outer filter bellows 46 from the radial outside to the radial inside and reaches the radial outer element interior 64 in purified form.

Another part of the air reaches, after a change of the mean flow direction by approximately 90°, approximately axially in relation to the axis 32, the inlet-side airflow region 104. The air flows through the intermediate spaces between the spacer webs 62 and reaches the inlet opening 58. The air flows toward the radial inner element interior 60. It flows through the radial inner filter bellows 48 from the radial inside to the radial outside, is purified, and also reaches the radial outer element interior 64.

The purified air from the radial outer element interior 64 flows through the outlet opening 66 into an intermediate space between the main filter element 44 and the secondary filter element 98. The purified air flows through the secondary filter element 98, is freed therein of any possible smaller particles and finally leaves the air filter 10 through the outlet nozzle 36 and reaches the internal combustion engine.

Figure 9:
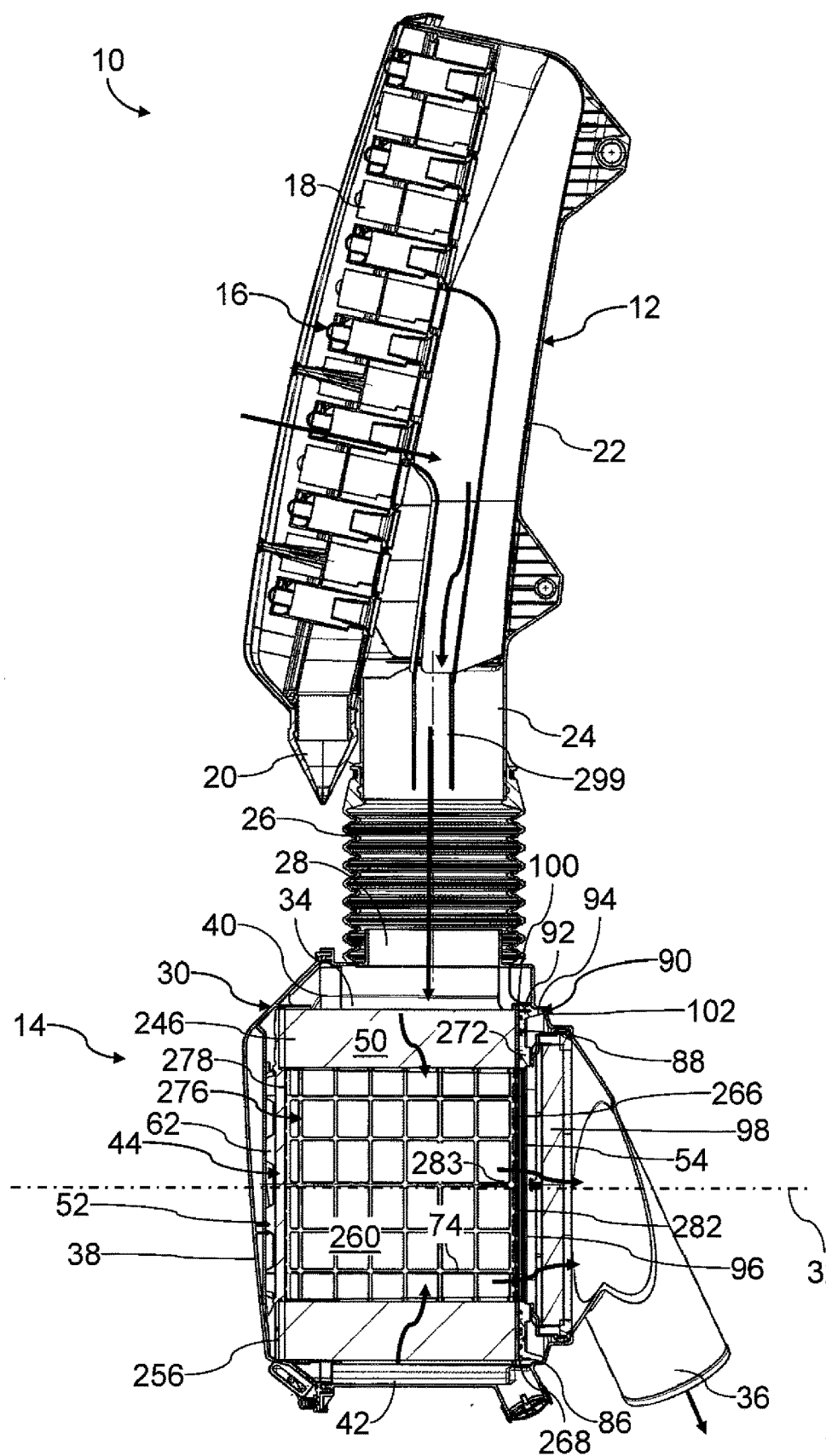
FIG. 9 shows a long-side longitudinal section of a second exemplary embodiment of an air filter of an internal combustion engine.
Figure 10:
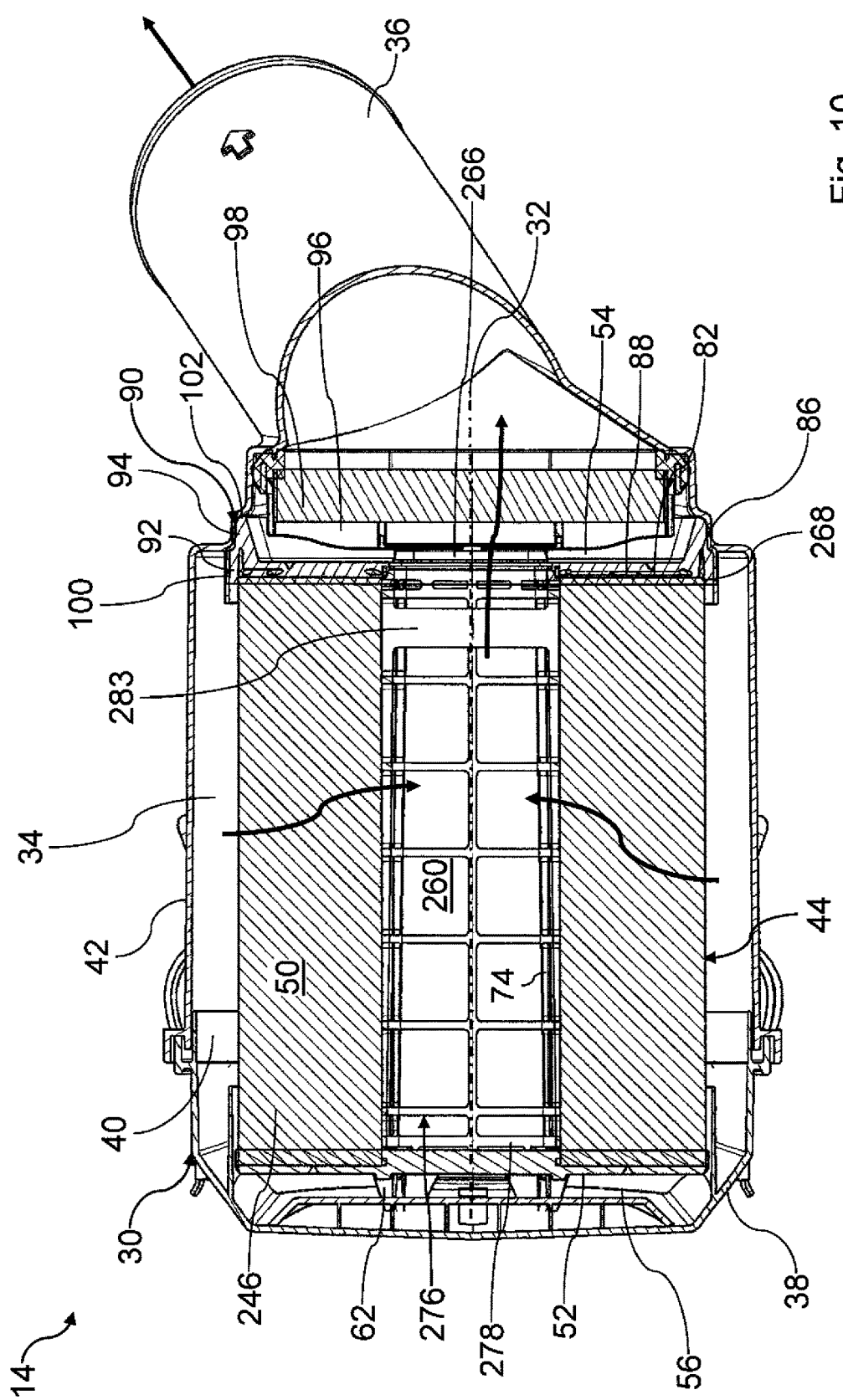
FIG. 10 shows a transverse-side longitudinal section of a main filter of the air filter from FIG. 9.

An air filter 10 according to a second exemplary embodiment is shown in FIGS. 9 to 15. The elements which are similar to those of the first exemplary embodiment from FIGS. 1 to 8 are provided with the same reference signs.

In contrast to the first exemplary embodiment, in the second exemplary embodiment, the main filter element 44 only has a single filter bellows 246 having a single element interior 260 instead of two filter bellows. The filter bellows 246 has a linear flat-oval cylindrical shape.

An inlet-side end disk 256 is continuously closed in the second exemplary embodiment and does not have an inlet opening, in contrast to the first exemplary embodiment. The element interior 260 of the filter bellows 246 is closed on the inlet-side end side 52 using the inlet-side end disk 256.

The inlet-side end disk 256 has a total of eight spacer webs 62.

Furthermore, instead of the two-part outlet-side end disk consisting of the radial inner outlet-side end disk and the radial outer outlet-side end disk, in the second exemplary embodiment, a coherent outlet-side end disk 268 is provided. The outlet-side end disk 268 has a central flat-oval outlet opening 266, which is coaxial to the element axis 32.

Instead of the outlet-side support web 72, in the second exemplary embodiment, two outlet-side support webs 272 are provided, which are located on narrow sides, which are opposite with respect to the element axis 32, of the outlet-side end disk 268 radially outside the outlet opening 266.

In the support frame 276 of the second exemplary embodiment, in contrast to the support frame from the first exemplary embodiment, an inlet-side circumferential frame section 278 extends on the circumference along the inlet-side end side 52 of the filter bellows 246. The inlet-side circumferential frame section 278 can be constructed similarly to or different from the inlet-side circumferential frame section 78 in the first exemplary embodiment.

A radial inner outlet-side circumferential frame section, as in the first exemplary embodiment, is omitted in the second exemplary embodiment. The outlet-side circumferential frame section 82 in the second exemplary embodiment can be constructed similarly to or different from the radial outer outlet-side circumferential frame section 82 of the first exemplary embodiment.

In the second exemplary embodiment, the support frame 276 additionally has a support strut 283 in the region of its end facing toward the outlet-side end side 54. The support strut 283 extends in the direction of the short transverse axis of the oval support frame 276 and perpendicularly in relation to the element axis 32 transversely through the element interior 260. The support strut 283 is used for supporting the long flat sides of the filter bellows 246.

In addition, in the second exemplary embodiment, the pre-filter 12 has a plurality of guiding geometries 299 on the outgoing flow side of the cyclone box 16. A partial vacuum can be made more uniform during operation of the air filter 10 using the guiding geometries 299.

What is claimed is:

1. A filter for filtering fluid, including:
   a filter housing having
      at least one inlet for fluid to be filtered; and
      at least one outlet for filtered fluid;
   wherein the filter housing is configured to receive at least one multiple-bellows hollow filter element such that it separates the at least one inlet from the at least one outlet;
   wherein the filter housing comprises:
      at least one first housing part having at least one installation opening through which the at least one multiple-bellows hollow filter element is received into the filter housing;
      at least one second housing part closing the installation opening;
      a housing sealing step surface extending circumferentially on an interior of the filter housing, the housing sealing step surface having:
         a first housing sealing surface step extending circumferentially; and
         a second housing sealing surface step extending circumferentially and connected to the first housing sealing surface step, the second housing sealing surface step arranged radially outwardly from the first housing surface step providing a step configuration of the circumferential housing sealing step surface; and
   wherein each of the at least one multiple-bellows hollow filter element comprises:
      a plurality of filter bellows nested radially, one inside another, relative to an element axis, and secured together to form a unitary filter element;
      wherein each of the plurality of filter bellows comprises at least one filter medium through which flow occurs for filtering the fluid;
      wherein the plurality of filter bellows at least partially delimits at least one element interior of the at least one multiple-bellows hollow filter element;
      a double radial seal of an elastomer material fixed onto a first axial end of the multiple-bellows hollow filter element, the double radial seal having:
         a first seal bulge projecting in an axial direction outwards from the first axial end to free seal end edge at an axial outer end of the double radial seal, the first seal bulge configured to seal radially against the first housing sealing surface step of a filter housing sealing step surface at the interior of the of the filter housing;
         a second seal bulge projecting radially outwardly beyond the first seal bulge and projecting radially outwardly beyond a radially outer side of the filter medium of the multiple-bellows hollow filter element, the second seal bulge configured to seal radially against the second housing sealing surface step of the filter housing sealing step surface;
      wherein an element axis of the at least one multiple-bellows hollow filter element extends coaxially, axially, or in parallel to an installation/removal axis of the at least one multiple-bellows hollow filter element, in relation to which the at least one multiple-bellows hollow filter element is installed through the at least one installation opening into the filter housing and removed from the filter housing in parallel, axially, or coaxially.

2. The filter according to claim 1, wherein
the at least one second housing part, at least in the final mounting state of the filter, exerts a force acting at least axially in relation to the element axis onto the at least one multiple-bellows hollow filter element.

3. The filter according to claim 2, wherein
the force from the at least one second housing part engages onto at least one support nub and/or at least one support frame and/or at least one end body and/or at least one seal of the at least one multiple-bellows hollow filter element.

4. The filter according to claim 1, wherein
the at least one multiple-bellows hollow filter element comprises at least one spacer element in the form of at least one support nub and/or at least one support web.

5. The filter according to claim 1, wherein
the at least one multiple-bellows hollow filter element comprises at least one end body on an axial end side with respect to the element axis.

6. The filter according to claim 1, wherein
the filter comprises at least one secondary filter element arranged proximate to the first axial end of the multiple-bellows hollow filter element;
wherein the double radial seal radially surrounds the at least one secondary filter element.

7. A multiple-bellows hollow filter element, of a filter for filtering fluid according to claim 1, including:

a plurality of filter bellows, nested radially one inside the another and secured together to form a unitary filter element;

wherein each of the plurality of filter bellows comprises:

at least one filter medium through which flow occurs for filtering the fluid;

wherein the plurality of filter bellows at least partially delimits at least one element interior of the at least one multiple-bellows hollow filter element;

a double radial seal of an elastomer material fixed onto a first axial end of the multiple-bellows hollow filter element, the double radial seal having:

a first seal bulge projecting in an axial direction outwards from the first axial end to free seal end edge at an axial outer end of the double radial seal, the first seal bulge configured to seal radially against a first housing sealing surface step of a filter housing sealing step surface;

a second seal bulge projecting radially outwardly beyond the first seal bulge and projecting radially outwardly beyond a radially outer side of the filter medium of the plurality of filter bellows, the second seal bulge configured to seal radially against a second housing sealing surface step of the filter housing sealing step surface;

wherein an element axis of the at least one multiple-bellows hollow filter element extends coaxially, axially, or in parallel to an installation/removal axis of the at least one multiple-bellows hollow filter element, in relation to which the at least one multiple-bellows hollow filter element is installed through an installation opening into the filter housing and removed from the filter housing in parallel, axially, or coaxially.

* * * * *